(12) United States Patent
Devreese et al.

(10) Patent No.: US 10,883,573 B2
(45) Date of Patent: Jan. 5, 2021

(54) DUAL CLUTCH TRANSMISSION WITH A REVERSE COUNTERSHAFT

(71) Applicant: DANA BELGIUM N.V., Bruges (BE)

(72) Inventors: Thibault G. Devreese, Ghent (BE); Benoit Vandevoorde, Ghent (BE)

(73) Assignee: Dana Belgium N.V., Bruges (BE)

( * ) Notice: Subject to any disclaimer, the term of this patent is extended or adjusted under 35 U.S.C. 154(b) by 272 days.

(21) Appl. No.: 16/069,543

(22) PCT Filed: Jan. 12, 2017

(86) PCT No.: PCT/EP2017/050588
§ 371 (c)(1),
(2) Date: Jul. 12, 2018

(87) PCT Pub. No.: WO2017/121813
PCT Pub. Date: Jul. 20, 2017

(65) Prior Publication Data
US 2019/0024757 A1    Jan. 24, 2019

Related U.S. Application Data

(60) Provisional application No. 62/277,627, filed on Jan. 12, 2016.

(51) Int. Cl.
| F16H 3/093 | (2006.01) |
| F16H 3/00 | (2006.01) |
| F16H 3/08 | (2006.01) |

(52) U.S. Cl.
CPC ............. *F16H 3/093* (2013.01); *F16H 3/006* (2013.01); *F16H 2003/0822* (2013.01); *F16H 2200/006* (2013.01); *F16H 2200/0091* (2013.01); *F16H 2200/0095* (2013.01)

(58) Field of Classification Search
CPC ............. F16H 3/093; F16H 2003/0822; F16H 2200/0091; F16H 2200/0095
See application file for complete search history.

(56) References Cited

U.S. PATENT DOCUMENTS

| 6,397,994 B1 | 6/2002 | Bowen |
| 6,958,028 B2 | 10/2005 | Janson |
| 8,011,274 B2 | 9/2011 | Abramov |
| 8,485,055 B2 | 7/2013 | Gumpoltsbeger |
| 8,720,290 B2 | 5/2014 | Baldwin |
| 8,887,589 B2 | 11/2014 | Ibamoto |
| 2008/0134818 A1 | 6/2008 | Gitt |
| 2011/0290072 A1 | 12/2011 | Xie |
| 2015/0292606 A1 | 10/2015 | Lübke |

(Continued)

FOREIGN PATENT DOCUMENTS

| DE | 102013020564 | 2/2015 |
| WO | 2013167095 | 11/2013 |

OTHER PUBLICATIONS

European Patent Office, International Search Report with Written Opinion issued in PCT/EP2017/050588, dated Apr. 18, 2017, 14 pages, European Patent Office, Rijswijk, Netherlands.

*Primary Examiner* — Terence Boes
(74) *Attorney, Agent, or Firm* — Marshall & Melhorn, LLC (57) ABSTRACT

Provided herein is a dual clutch transmission including a reverse countershaft that is selectively engaged with at least one primary shaft and provides speed ratio changes without torque interruption and a compact axial arrangement.

14 Claims, 4 Drawing Sheets

(56) References Cited

U.S. PATENT DOCUMENTS

2016/0069425 A1* 3/2016 Yang .................... B60K 17/165
    74/661
2016/0131223 A1* 5/2016 Hemphill ................ F16H 3/006
    74/331
2016/0298732 A1* 10/2016 Enami .................... F16H 3/091

* cited by examiner

DUAL CLUTCH TRANSMISSION WITH A REVERSE COUNTERSHAFT

RELATED APPLICATIONS

This application claims the benefit of U.S. Provisional Application No. 62/277,627 filed on Jan. 12, 2016, which is herein incorporated by reference.

FIELD

The present disclosure relates to a transmission for use in motor vehicles and, more particularly, to a dual clutch transmission having a reverse countershaft.

BACKGROUND

Dual clutch transmissions (DCT) are used extensively in driveline systems for motor vehicles. DCTs include parallel shafts between two independent gearboxes coupled on a common output axis. Each of the parallel shafts is disconnected from the engine of a motor vehicle using wet-plate clutch systems.

Even and odd gear sets are separated over the two parallel shafts in the DCT. When the vehicle is being driven in an even gear, a corresponding clutch is engaged while the odd numbered clutch remains open. Consequently, it is possible to preselect an odd gear since the gear set is not connected to the engine via the odd number clutch. Therefore, shifting between even and odd gears only requires switching the engagement of the two clutches.

DCTs are able to shift more quickly than conventional single clutch systems. Moreover, since the parallel shafts split the gears into two subsets, the axial length is reduced compared to traditional gearboxes. Although the axial length has been reduced due to the parallel shafts, the total length of the gearbox containing the shafts remains long if a large speed ratio range is required by the motor vehicle. In particular, an increased number of reverse speed ratios increases the axial length of the gearbox.

Reverse gears are traditionally mounted on the parallel shafts using an extra idle gear between the reversing gears. Each reverse gear added to one of the parallel shafts results in longer axial lengths of the parallel shafts when the number of reverse speed ratios desired is large. This set up allows for multiple powershifts. However, the axial length of the DCT is increased as the number of reversing shifts increase.

A direct interconnection of the two parallel shafts is a possible solution for decreasing the length of the reverse gearing; however, it does not provide power shifts in the reverse mode as only the gears of one shaft are used while the other shaft is used as a reversing idler shaft. This set up does not increase the axial length due to the reverse gearing; however, the shifts in reverse mode have to be enabled using a preselector system and powershifts in the reverse mode are not allowed.

It, therefore, would be advantageous to have a dual clutch transmission with a decreased axial length of the gearbox while keeping the powershift function in reverse mode.

SUMMARY

Provided herein is a dual clutch transmission including an input shaft drivingly connected to an engine, an output shaft, a first primary shaft and a second primary shaft. The primary shafts have a plurality of gears rotatably mounted thereon. A first clutch is directly connected to the second primary shaft and drivingly connected to the input shaft. A second clutch is directly connected to the first primary shaft and is drivingly connected to the input shaft. The DCT further includes a first and second countershaft having a plurality of even gears selectively fixed thereto, a plurality of odd gears selectively fixed thereto, and rigidly fixed gears attached thereto. The plurality of even gears are selectively in driving engagement with the plurality of gears on the first primary shaft, the plurality of odd gears are selectively in driving engagement with the plurality of the second primary shaft, and the first rigidly fixed gear is in driving engagement with the output shaft. The DCT further includes a reverse countershaft having a plurality of odd and even gears selectively fixed thereto and a rigidly fixed gear attached thereto drivingly engaged with a second rigidly fixed gear on the first countershaft. The odd gears on the reverse countershaft are selectively engaged with the plurality of gears mounted on the first primary shaft and the even gears on the reverse countershaft are selectively engaged with the plurality of gears mounted on the second primary shaft.

Provided herein is also a dual clutch transmission including an input shaft drivingly connected to an engine, an output shaft and a primary shaft having a plurality of gears rotatably mounted thereto. A first clutch is drivingly engaged with the input shaft and a first countershaft. A second clutch is drivingly engaged with the input shaft and a second countershaft. The DCT further includes a first reverse countershaft and a second reverse countershaft. The first countershaft has a plurality of odd gears selectively fixed thereto in driving engagement with the plurality of gears on the primary shaft and a rigidly fixed gear in driving engagement with the first reverse countershaft. The second countershaft has a plurality of even gears selectively fixed thereto in selective driving engagement with the plurality of gears on the primary shaft and a rigidly fixed gear attached thereto in driving engagement with the second reverse countershaft. The first reverse countershaft has a plurality of even gears selectively fixed thereto and in selective driving engagement with the plurality of gears on the primary shaft and a rigidly fixed gear attached thereto drivingly engaged with the rigidly fixed gear on the first countershaft. The second reverse countershaft has a plurality of odd gears selectively fixed thereto and in selective driving engagement with the plurality of gears on the primary shaft and a rigidly fixed gear attached thereto drivingly engaged with the rigidly fixed gear on the second countershaft.

BRIEF DESCRIPTION OF THE DRAWINGS

The above, as well as other advantages of the present disclosure, will become readily apparent to those skilled in the art from the following detailed description when considered in the light of the accompanying drawings in which.

DETAILED DESCRIPTION OF THE PREFERRED EMBODIMENTS

It is to be understood that the embodiments may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments.

Figure 1:
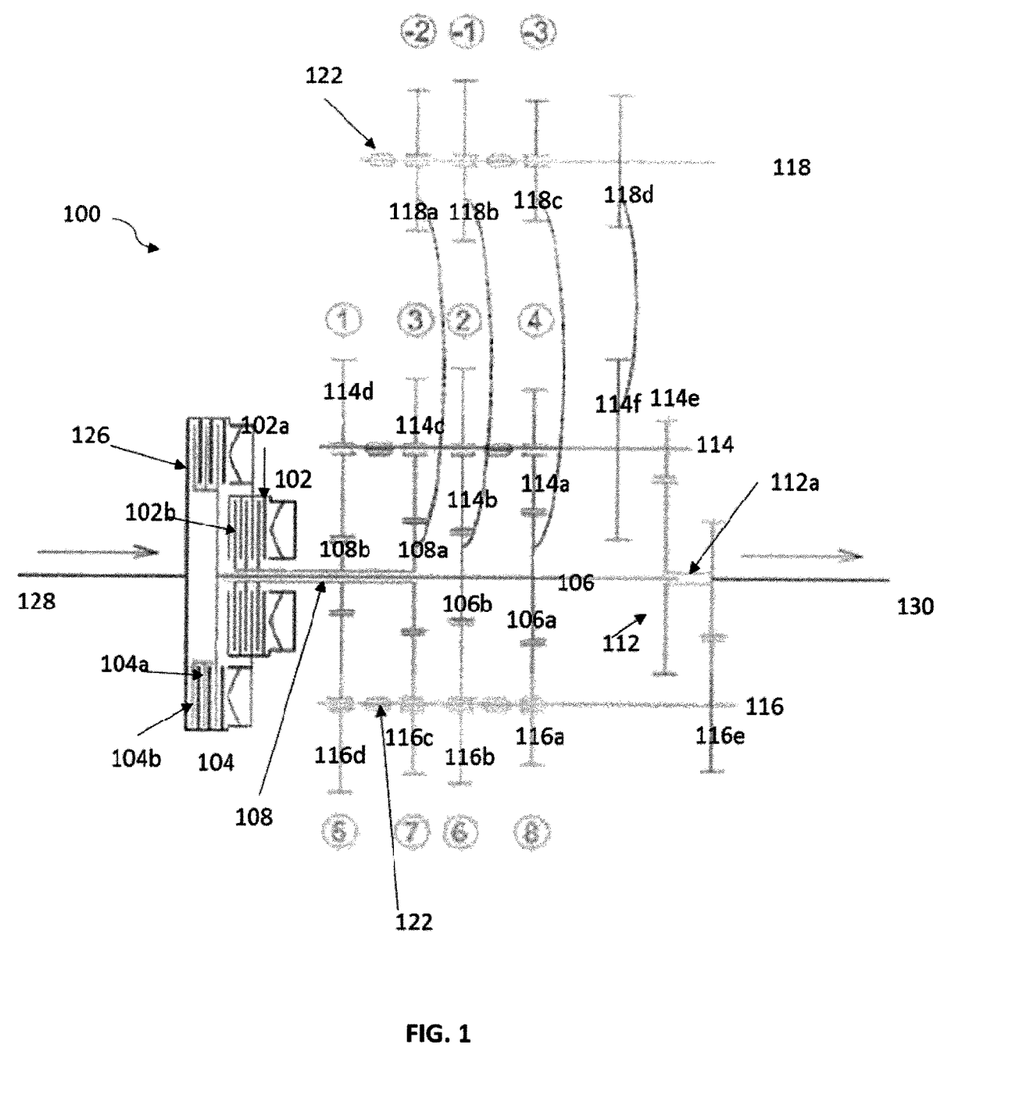
FIG. 1 is a schematic view of a preferred embodiment of a dual clutch transmission.

FIG. 1 depicts one embodiment of a dual clutch transmission (DCT) 100. The DCT 100 is driven by an input shaft 128 driven by an engine (not shown) of a motor vehicle. The DCT 100 is configured to provide speed ratio changes without torque interruption. In one embodiment, the DCT 100 includes two clutches 102, 104. In some embodiments, a first clutch 102 is an inner clutch and a second clutch 104 is an outer clutch. The first and second clutches 102, 104 are concentric with respect to each other. The concentric clutches 102, 104 provide a compact arrangement. The first and second clutches 102, 104 are disposed within a clutch housing 126 that is drivingly fixed to the input shaft 128.

In one embodiment, the clutches 102, 104 are wet-plate style clutches having a set of friction plates 102a, 104a attached to the clutch housing 126. A second set of friction plates 102b, 104b are splined for rotation to a primary shaft 106, 108. The first and second set of friction plates 102a, 102b are interleaved with each other and form a clutch pack. The first and second set of friction plates 104a, 104b are interleaved with each other and form another clutch pack. The clutches 102, 104 are actuated by an electric, hydraulic or pneumatic operator (not illustrated) which selectively connects the input shaft 128 with the primary shafts 106, 108.

Figure 2:
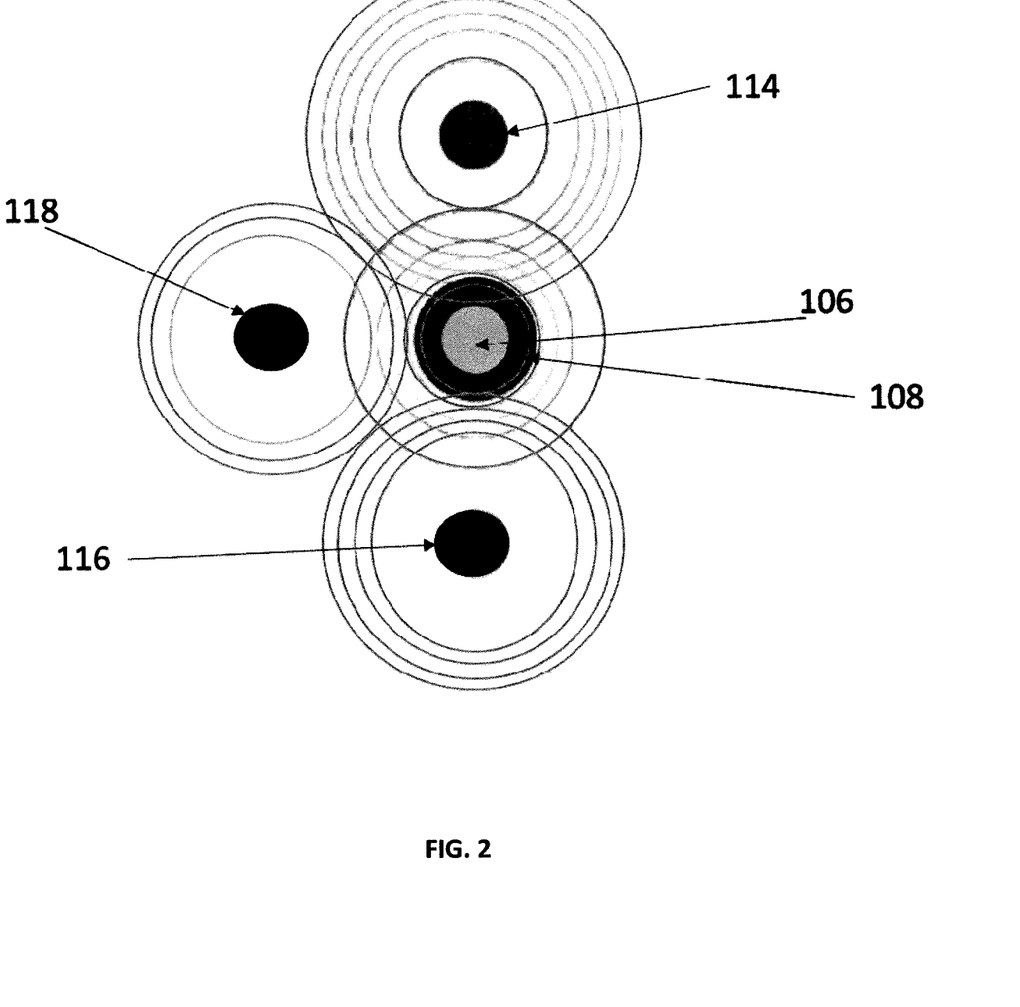
FIG. 2 is a schematic end view showing the relative positions of the shafts in the dual clutch transmission of FIG. 1.

As shown in FIG. 1, the second clutch 104 is drivingly connected to a first primary shaft 106. The first clutch 102 is drivingly connected to a second primary shaft 108. The second primary shaft 108 is radially outward from the first primary shaft 106. The second primary shaft 108 and the first primary shaft 106 are concentric with one another as shown in FIG. 2. The clutches 102, 104 establish a connection between the input shaft 128 and the primary shafts 106, 108 respectively.

The second primary shaft 108 has a set of primary gears 108a, 108b mounted thereon. The first primary shaft 106 has a set of primary gears 106a, 106b mounted thereon. The gears 108a, 108b, 106a, 106b are selectively connectable with countershafts 114, 116, 118 to provide forward and reverse speed ratios. The number of primary gears rotatably mounted on the primary shafts 106, 108 vary depending on the number of forward and reverse speed ratios needed for the application.

A first countershaft 114 is radially outward from the primary shafts 106, 108. The first countershaft 114 has a set of even gears 114a, 114b selectively fixed thereto. The even gears 114a, 114b selectively mesh with the primary gears 106a, 106b mounted on the first primary shaft 106. As shown in FIG. 1, the first countershaft 114 has two even gears 114a, 114b selectively fixed thereto; however, the number of even gears mounted on the countershaft 114 can vary depending on the application.

The first countershaft 114 has a set of odd gears 114c, 114d selectively fixed thereto. The odd gears 114c, 114d selectively mesh with the primary gears 108a, 108b connected to the second primary shaft 108. As shown in FIG. 1, the first countershaft 114 has two odd gears 114c, 114d selectively fixed thereto; however, the number of odd gears mounted on the countershaft 114 can vary depending on the application.

Additionally, the first countershaft 114 includes a first rigidly gear 114e fixed thereto. The first rigidly fixed gear 114e is drivingly connected to an output shaft 130. In one embodiment, gear 114e is drivingly connected to the output shaft 130 by a gearset 112 having a carrier 112a rotationally connected to the output shaft 130.

The second countershaft 116 is radially outward from the primary shafts 106, 108. The second countershaft 116 has a set of even gears 116a, 116b selectively fixed thereto. The even gears 116a, 116b selectively mesh with the primary gears 106a, 106b connected to the first primary shaft 106. As shown in FIG. 1, second countershaft 116 has two even gears 106a, 106b selectively fixed thereto; however, the number of even gears mounted on the countershaft 116 can vary depending on the application.

The second countershaft 116 has a set of odd gears 116c, 116d selectively fixed thereto. The odd gears 116c, 116d selectively mesh with the primary gears 108a, 108b connected to the second primary shaft 108. As shown in FIG. 1, the second countershaft 116 has two even gears 116c, 116d mounted thereon; however, the number of odd gears mounted on the countershaft 116 can vary depending on the application.

Additionally, the second countershaft 116 includes a first rigidly fixed gear 116e. The first rigidly fixed gear 116e is drivingly connected to the output shaft 130. In one embodiment, gear 116e is drivingly connected to the output shaft 130 by gearset 112.

In one embodiment, as shown in FIG. 2, the second countershaft shaft 116 and the first countershaft 114 are parallel with the primary shafts 106, 108 to provide a compact arrangement. The reverse countershaft 118 is also parallel with primary shafts 106, 108 to provide a compact arrangement.

Thus, the forward even speed ratios are established using the primary gears 108a, 108b on the first primary shaft 106 and the even gears 114a, 114b, 116a, 116b and the forward odd speed ratios are established between the primary gears 106a, 106b on the primary shaft 108 and the odd gears 114c, 114d, 116c, 116d. Gears 114d and 108b provide a first forward speed ratio and gears 114c and 108b provide a third forward speed ratio. Gears 114b and 106b provide a second forward speed ratio and gears 114a and 106a provide a fourth forward speed ratio. Gears 116d and 108b provide a fifth forward speed ratio and gears 116c and 108a provide a seventh forward speed ratio. Gears 116b and 106b provide a sixth forward speed ratio and gears 116a and 106a provide an eighth forward speed ratio.

A third countershaft, or reverse countershaft 118, is radially outward from the primary shafts 106, 108. The third countershaft 118 has a set of gears 118a, 118b, 118c, selectively fixed thereto. An even set of gears 118a selectively mesh with the gear 108a on the primary shaft 108. An odd set of gears 118b, 118c that selectively mesh with the gears 106a, 106b on the primary shaft 106. As depicted in FIG. 1, the reverse countershaft 118 has one even gear 118a and two odd gears 118b, 118c mounted thereon; however, the number of even and odd gears mounted on the countershaft 118 can vary depending on the application. Thus, the reverse even speed ratios are established between the gear 108a on the primary shaft 108 and gears 118a the reverse countershaft 118 and the reverse odd speed ratios are established between the gears 106a, 106b on the primary shaft 106 and the reverse countershaft 118. Gears 118b and 106b provide a first reverse speed ratio, gears 118a and 108a provide a second reverse speed ratio, and gears 118c and 106a provide a third reverse speed ratio.

Additionally, a rigidly fixed gear 118d is rotationally mounted on the reverse countershaft 118 and meshes with a second rigidly fixed gear 114f rotatably mounted on the first countershaft 114.

In one embodiment, as shown in FIG. 1, the countershafts 114, 116, 118 have a preselector system 122 used to selectively fix the gears 114a, 114b, 114c, 114d, 116a, 116b, 116c, 116d, 118a, 118b, 118c to the countershafts 114, 116, 118 respectively. The preselector system 122 selectively fixes gears 114a, 114b, 114c, 114d to countershaft 114, gears 116a, 116b, 116c, 116d to countershaft 116 and gears 118a, 118b, 118c to reverse countershaft 118 to preselect the gear desired for engagement or disengagement. The preselector system 122 can be actuated by an electrically, hydraulically or pneumatically.

The DCT 100 provides multiple forward and reverse speed ratio connections. For example, the DCT 100 depicted in FIG. 1 has eight forward speed ratios and three reverse speed ratios although more or less speed ratios in the forward and reverse directions are possible depending on the need of the application. Preferably, the number of reverse speed ratios are less than or equal to half the number of forward speed ratios.

Figure 3:
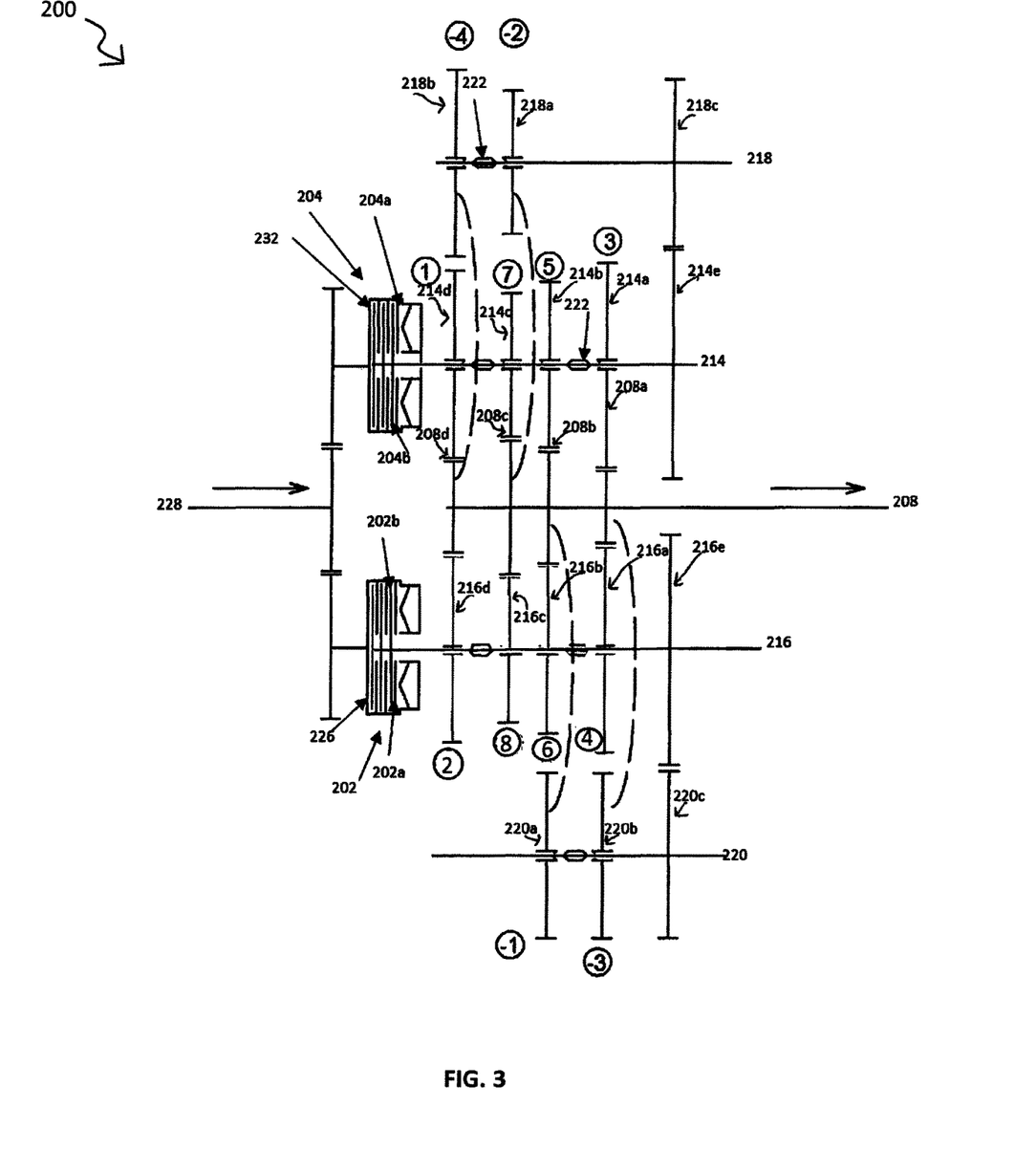
FIG. 3 is a schematic view of another preferred embodiment of a dual clutch transmission.

FIG. 3 depicts another embodiment of a dual clutch transmission (DCT) 200. The DCT 200 includes an input shaft 228 driven by an engine (not shown) of a motor vehicle. In one embodiment, the DCT 200 includes two clutches 202, 204. In some embodiments, a first clutch 202 is an inner clutch and a second clutch 204 is an outer clutch. The first and second clutches 202, 204 are parallel to each other to provide a compact arrangement. The first and second clutches 202, 204 are disposed within clutch housings 226, 232 respectively. The clutch housings 226, 232 are drivingly connected to the input shaft 228.

In one embodiment, the clutches 202, 204 are wet-plate style clutches having a set of friction plates 202a, 204a attached to clutch housings 226, 232. A second set of friction plates 202b, 204b are splined for rotation countershafts 214, 216 respectively. The first and second set of friction plates 202a, 202b are interleaved with each other and form a clutch pack. The first and second set of friction plates 204a, 204b are interleaved with each other and form another clutch pack. The clutches 202, 204 are actuated by an electric, hydraulic or pneumatic operator (not illustrated) and selectively connect the input shaft 228 with the countershafts 214, 216.

As shown in FIG. 3, the second clutch 204 is drivingly connected to a first countershaft 214. The first clutch 202 is drivingly connected to the countershaft 216. The clutches 202, 204 establish a connection between the engine output shaft 228 and the countershafts 214, 216 respectively.

A primary shaft 208 has a set of gears 208a, 208b, 208c, 208d rotatable mounted thereon. The primary shaft 208 is an output shaft for the DTC 200. The first countershaft 214 has a set of gears 214a, 214b, 214c, 214d selectively fixed thereto. The second countershaft 216 has a set of gears 216a, 216b, 216c, 216d selectively fixed thereto. The gears 208a, 208b, 208c, 208d are selectively connectable with countershafts 214, 216, 218 to provide forward and reverse speed ratios. The number of primary gears rotatably mounted on the primary shaft 208 vary depending on the number of forward and reverse speed ratios need for the application.

The first countershaft 214 is radially outward from the primary shaft 208. The first countershaft 214 has a set of odd gears 214a, 214b, 214c, 214d selectively fixed thereto. The gears 214a, 214b, 214c, 214d selectively mesh with the primary gears 208a, 208b, 208c, 208d mounted on the primary shaft 208. As shown in FIG. 2, the first countershaft 214 has four odd gears 214a, 214b, 214c, 214d selectively fixed thereto; however, the number of gears mounted on the countershaft 214 can vary depending on the application. Additionally, the first countershaft 214 includes a rigidly fixed gear 214e mounted thereon. Gear 214e selectively meshes with a gear 218c rotatably mounted on a third countershaft 218.

The second countershaft 216 is radially outward from the primary shaft 208. The second countershaft 216 has a set of even gears 216a, 216b, 216c, 216d selectively fixed thereto. The gears 216a, 216b, 216c, 216d selectively mesh with the primary gears 208a, 208b, 208c, 208d connected to the primary shaft 208. As shown in FIG. 3, second countershaft 216 has four even gears 216a, 216b, 218c, 218d selectively fixed thereto; however, the number of even gears mounted on the countershaft 216 can vary depending on the application. Additionally, the second countershaft 216 includes a rigidly fixed gear 216e mounted thereon. Gear 216e selectively meshes with a gear 220c rotatably mounted on a fourth countershaft 220.

Thus, the forward even speed ratios are established using the primary gears 208a, 208b, 208c, 208d on the primary shaft 208 and the even gears 216a, 216b, 216c, 216d and the forward odd speed ratios are established between the primary gears 208a, 208b, 208c, 208d on the primary shaft 208 and the odd gears 214a, 214b, 214c, 214d.

Gears 214d and 208d provide a first forward speed ratio, gears 214a and 208a provide a third forward speed ratio, gears 214b and 208b provide a fifth forward speed ratio, and gears 214c and 208c provide a seventh forward speed ratio. Gears 216d and 208d provide a second forward speed ratio, gears 216a and 208a provide a fourth forward speed ratio, gears 216b and 208b provide a fourth forward speed ratio, and gears 216c and 208c provide an eighth forward speed ratio.

A third countershaft, or first reverse countershaft 218, is radially outward from the primary shaft 208. The third countershaft 218 has a set of gears 218a, 218b selectively fixed thereto. An even set of gears 218a, 218b selectively mesh with the gears 208c, 208d on the primary shaft 208. The reverse countershaft 218 has two even gears 218a, 218b selectively fixed thereto; however, the number of even gears mounted on the countershaft 218 can vary depending on the application. Thus, the reverse even speed ratios are established between the gears 208c, 208d on the primary shaft 208 and gears 218a, 218b the reverse countershaft 218. Gears 218a and 208c provide a second reverse speed ratio gears 218b and 208d provide a fourth reverse speed ratio. Additionally, a rigidly fixed gear 218c is rigidly mounted on the reverse countershaft 218 and meshes with a rigid gear 214e drivingly connected to the first countershaft 214.

A fourth countershaft or second reverse countershaft 220 is radially outward from the primary shaft 208. The fourth countershaft 220 has a set of gears 220a, 220b selectively fixed thereto. An odd set of gears 220a, 220b selectively mesh with the gears 208a, 208b on the primary shaft 208. The reverse countershaft 220 has two odd gears 220a, 220b selectively fixed thereto; however, the number of odd gears mounted on the countershaft 228 can vary depending on the application. Thus, the reverse odd speed ratios are established between the gears 208a, 208b on the primary shaft 208 and gears 220a, 220b the reverse countershaft 220. Gears 220a and 208b provide a first reverse speed ratio gears 220b and 208a provide a third reverse speed ratio.

Additionally, a rigidly fixed gear 220c is rigidly mounted on the reverse countershaft 220 and meshes with a rigid gear 216e drivingly connected to the second countershaft 216.

In one embodiment, the second countershaft shaft 216 and the first countershaft 214 are parallel with the primary shaft 208 to provide a compact arrangement. The reverse countershafts 218, 220 is also parallel with primary shaft 208 to provide a compact arrangement.

In one embodiment, as shown in FIG. 3, the shafts 214, 216, 218, 220 have a preselector system 222 connected thereto that rigidly fix the gears 214a, 214b, 214c, 214d, 216a, 216b, 216c, 216d, 218a, 218b, 220a, 220b to the shafts 214, 216, 218, 220 respectively. The preselector system 22 selectively fixes gears 214a, 214b, 214c, 214d to countershaft 214, gears 216a, 216b, 216c, 216d to countershaft 116, gears 218a, 218b, to reverse countershaft 218 and gears 220a, 220b, to reverse countershaft 218 to preselect the gear desired for engagement or disengagement. The preselector system 222 can be actuated by an electrically, hydraulically or pneumatically.

The DCT 200 provides multiple forward and reverse speed ratio connections. For example, the DCT 200 depicted in FIG. 3 has eight forward speed ratios and four reverse speed ratios although more or less speed ratios in the forward and reverse directions are possible depending on the need of the application. Preferably, the number of reverse speed ratios are less than or equal to half the number of forward speed ratios.

Figure 4:
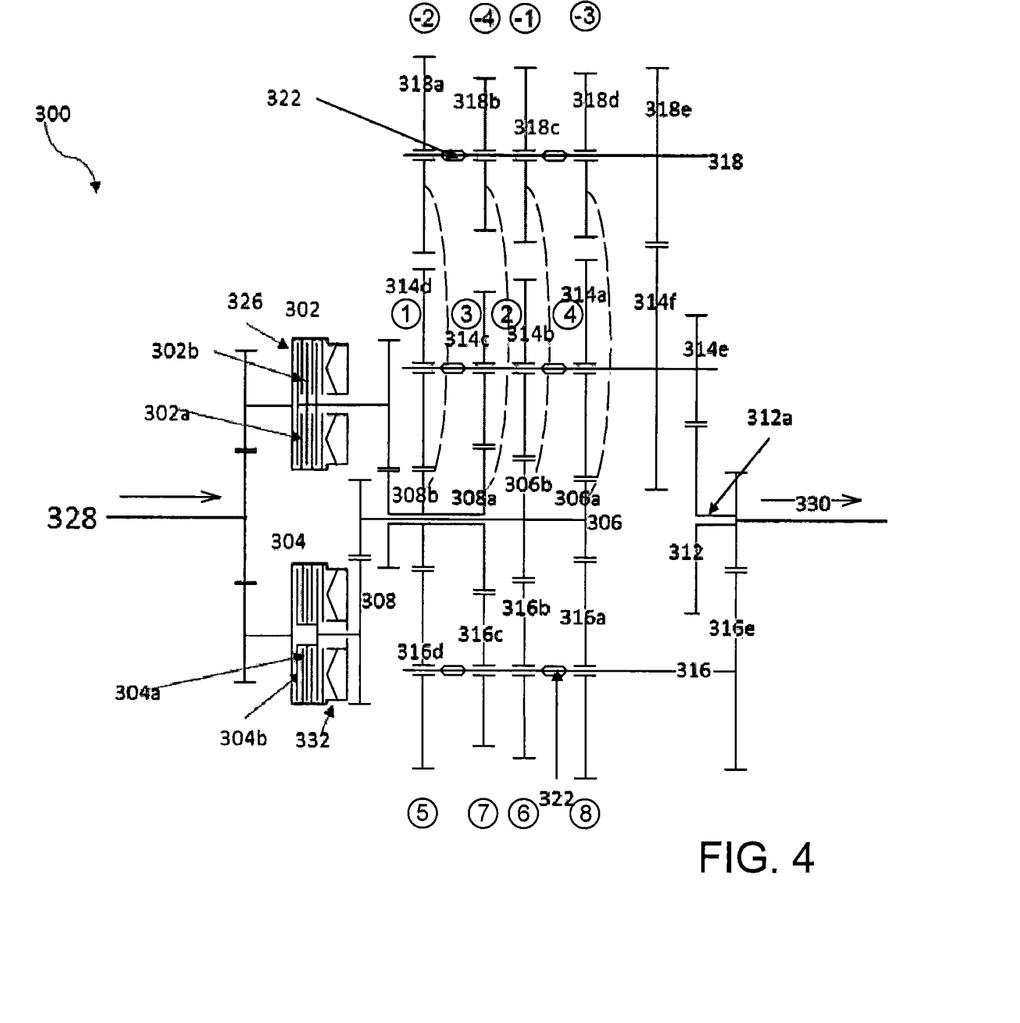
FIG. 4 is a schematic view of another preferred embodiment of a dual clutch transmission.

FIG. 4 depicts one embodiment of a dual clutch transmission (DCT) 300. The DCT 300 is driven by an input shaft 328 driven by an engine (not shown) of a motor vehicle. The DCT 300 is configured to provide speed ratio changes without torque interruption. In one embodiment, the DCT 300 includes two clutches 302, 304. In some embodiments, a first clutch 302 is an inner clutch and a second clutch 304 is an outer clutch. The first and second clutches 302, 304 are parallel with respect to each other to provide a compact arrangement. The clutches 302, 304 are disposed within clutch housings 326, 332 that are in driving engagement with the input shaft 328.

In one embodiment, the clutches 302, 304 are wet-plate style clutches having a set of friction plates 302a, 304a attached to clutch housings 326, 332, respectively. A second set of friction plates 302b, 304b are splined for rotation to a primary shaft 306, 308. The first and second set of friction plates 302a, 302b are interleaved with each other and form a clutch pack. The first and second set of friction plates 304a, 304b are interleaved with each other and form another clutch pack. The clutches 302, 304 are actuated by an electric, hydraulic or pneumatic operator (not illustrated) which selectively connects the input shaft 328 with the primary shafts 306, 308.

As shown in FIG. 4, the second clutch 304 is drivingly connected to a first primary shaft 306. The first clutch 302 is drivingly connected to a second primary shaft 308. The second primary shaft 308 is radially outward from the first primary shaft 306. The second primary shaft 308 and the first primary shaft 306 are concentric with one another as shown in FIG. 4 to provide a compact arrangement. The clutches 302, 304 establish a connection between the input shaft 328 and the primary shafts 306, 308 respectively.

The second primary shaft 308 has a set of primary gears 308a, 308b mounted thereon. The first primary shaft 306 has a set of primary gears 306a, 306b mounted thereon. The gears 308a, 308b, 306a, 306b are selectively connectable with countershafts 314, 316, 318 to provide forward and reverse speed ratios. The number of primary gears rotatably mounted on the primary shafts 306, 308 vary depending on the number of forward and reverse speed ratios need for the application.

A first countershaft 314 is radially outward from the primary shafts 306, 308. The first countershaft 314 has a set of even gears 314a, 314b selectively fixed thereto. The even gears 314a, 314b selectively mesh with the primary gears 306a, 306b mounted on the first primary shaft 306. As shown in FIG. 4, the first countershaft 314 has two even gears 314a, 314b selectively fixed thereto; however, the number of even gears mounted on the countershaft 314 can vary depending on the application. The first countershaft 314 has a set of odd gears 314c, 314d selectively fixed thereto. The odd gears 314c, 314d selectively mesh with the primary gears 308a, 308b connected to the second primary shaft 308. As shown in FIG. 4, the first countershaft 314 has two odd gears 314c, 314d selectively fixed thereto; however, the number of odd gears mounted on the countershaft 314 can vary depending on the application.

Additionally, the first countershaft 314 includes a first rigidly fixed gear 314e is rotatably mounted thereon. The first rigidly fixed gear 314e is drivingly connected to an output shaft 330. In one embodiment, gear 314e is drivingly connected to the output shaft 330 by a gearset 312 having a carrier 312a rotationally connected to the output shaft 330.

The second countershaft 316 is radially outward from the primary shafts 306, 308. The second countershaft 316 has a set of even gears 316a, 316b selectively fixed thereto. The even gears 316a, 316b selectively mesh with the primary gears 306a, 306b connected to the first primary shaft 306. As shown in FIG. 4, second countershaft 316 has two even gears 306a, 306b selectively fixed thereto; however, the number of even gears mounted on the countershaft 316 can vary depending on the application. The second countershaft 316 has a set of odd gears 316c, 316d selectively fixed thereto. The odd gears 316c, 316d selectively mesh with the primary gears 308a, 308b connected to the second primary shaft 308. As shown in FIG. 4, the second countershaft 316 has two even gears 316c, 316d mounted thereon; however, the number of odd gears mounted on the countershaft 316 can vary depending on the application.

Additionally, the second countershaft 316 includes a first rigidly fixed gear 316e is rotatably mounted thereon. The first rigidly fixed gear 316e is drivingly connected to the output shaft 330. In one embodiment, gear 316e is drivingly connected to the output shaft 330.

Thus, the forward even speed ratios are established using the primary gears 308a, 308b on the first primary shaft 306 and the even gears 314a, 314b, 316a, 316b and the forward odd speed ratios are established between the on the primary gears 306a, 306b on the primary shaft 308 and the odd gears 314c, 314d, 316c, 316d. Gears 314d and 308b provide a first forward speed ratio, gears 314b and 306b provide a second forward speed ratio, gears 314c and 308a provide a third forward speed ratio, and gears 314d and 308b provide a fourth forward speed ratio. Gears 316d and 308b provide a fifth forward speed ratio, gears 316b and 306b provide a sixth forward speed ratio, gears 316c and 308a provide a seventh forward speed ratio, and gears 316a and 306a provide an eighth forward speed ratio.

A third countershaft or reverse countershaft 318 is radially outward from the primary shafts 306, 308. The third countershaft 318 has a set of gears 318a, 318b, 318c, 318d selectively fixed thereto. An even set of gears 318a, 318b selectively mesh with the gear 308a, 308b on the primary shaft 308 such that gears 318a and 308b provide a second reverse speed ratio and gears 318b and 308a provide fourth reverse speed ratio. An odd set of gears 318c, 318d that mesh with the gears 306a, 306b on the primary shaft 306 such that gears 318c and 306b provide a first reverse speed ratio and gears 318d and 306a provide fourth reverse speed ratio. As depicted in FIG. 4, the reverse countershaft 318 has two even gears 318a, 318b and two odd gears 318c, 318d mounted thereon; however, the number of even and odd gears mounted on the countershaft 318 can vary depending on the application. Thus, the reverse even speed ratios are established between the gears 308a on the primary shaft 308 and gears 318a, 318b the reverse countershaft 318 and the reverse odd speed ratios are established between the gears 306a, 306b on the primary shaft 306 and the reverse countershaft 318.

Additionally, a first rigidly fixed gear 318e is rotatably mounted on the reverse countershaft 318 and meshes with a second rigidly fixed gear 314f rotatably mounted on the first countershaft 314.

In one embodiment, the second countershaft shaft 316 and the first countershaft 314 are parallel, but offset from the primary shafts 306, 308 to provide a compact arrangement. The reverse countershaft 318 is also parallel, but offset with primary shafts 306, 308 to provide a compact arrangement.

In one embodiment, as shown in FIG. 4, the countershafts 314, 316, 318 have a preselector system 322 used to selectively fix the gears 314a, 314b, 314c, 314d, 316a, 316b, 316c, 316d, 318a, 318b, 318c, 318d to the countershafts 314, 316, 318 respectively. The preselector system 322 selectively fixes gears 314a, 314b, 314c, 314d to countershaft 314, gears 316a, 316b, 316c, 316d to countershaft 316, and gears 318a, 318b, 318c, 318d to reverse countershaft 318 to preselect the gear desired for engagement or disengagement. The preselector system 322 can be actuated by an electrically, hydraulically or pneumatically.

The DCT 300 provides multiple forward and reverse speed ratio connections. For example, the DCT 300 depicted in FIG. 4 has eight forward speed ratios and four reverse speed ratios although more or less speed ratios in the forward and reverse directions are possible depending on the need of the application. Preferably, the number of reverse speed ratios are less than or equal to half the number of forward speed ratios.

The DCT 100, 200, 300 has a forward operational mode wherein a reverse countershaft 118, 218, 220, 318 operates in forward mode. Both clutches 102, 202, 302, 104, 204, 304 are (dis)engaged gradually such that the torque transfer is never interrupted resulting in smooth shifts.

When operated in an even gear, an odd gear can be preselected using the preselector system 122, 222, 322. The speed ratio/gears are shifted by disengaging the second clutch 104, 204, 304 and engaging the first clutch 102, 202, 302. Both clutches 102, 202, 302, 104, 204, 304 are (dis)engaged gradually such that the torque transfer is never interrupted resulting in smooth shifts.

To upshift, the gear set to be engaged is preselected using the preselector system 122, 222, 322 and simultaneously the first 102, 202, 302 and second clutches 104, 204, 304 are engaged/disengaged. To downshift, the previous gear set is selected using the preselector system 122, 222, 322 and the first 102, 202, 302 and second 104, 204, 302 clutches 102,104 are simultaneously engaged/disengaged.

The clutches 102, 104, 202, 204, 302, 304 and the preselector systems 122, 222, 322 may be controlled using a control unit (not pictured). The control unit can be, but is not limited to a hydro-electronic control unit. The hydro-electronic control unit pressurizes the clutches 102, 202, 302, 104, 204, 304 and the preselector systems 122, 222, 322 in order to engage/disengage the corresponding elements.

The forward and reverse speed ratios of the DCT 100/200/300 are operated such that shifts between the speed ratios are realized by selectively engaging and disengaging the clutches 102, 104, 202, 204, 302, 304. All forward-reverse shifts are smooth shift and the gear number stays the same: +1/−1, +2/−2, +3/−1 as shown in FIGS. 1 and 3-4. A shift control unit (not shown) is used to limit forward-reverse to these shifts such that it cannot do +2/−1 for instance.

In accordance with the provisions of the patent statutes, the present embodiments have been described in what is considered to represent its preferred embodiments. However, it should be noted that the disclosure can be practiced otherwise than as specifically illustrated and described without departing from its spirit or scope.

We claim:

1. A dual clutch transmission, comprising:
an input shaft drivingly connected to an engine;
an output shaft;
a first primary shaft having a plurality of gears rotatably mounted thereon;
a second primary shaft having a plurality of gears rotatably mounted thereon;
a first clutch directly connected to the second primary shaft and drivingly connected to the input shaft;
a second clutch directly connected to the first primary shaft and drivingly connected to the input shaft;
a first countershaft having a plurality of even gears selectively fixed thereto, a plurality of odd gears selectively fixed thereto, a first rigidly fixed gear attached thereto, and a second rigidly fixed gear attached thereto, wherein the plurality of even gears are selectively in driving engagement with the plurality of gears on the first primary shaft, the plurality of odd gears are selectively in driving engagement with the plurality of gears on the second primary shaft, and the first rigidly fixed gear is in driving engagement with the output shaft;
a second countershaft having a plurality of even gears selectively fixed thereto, a plurality of odd gears selectively fixed thereto, and a first rigidly fixed gear attached thereto, wherein the plurality of even gears are selectively in driving engagement with the plurality of gears on the first primary shaft, the plurality of odd gears are selectively in driving engagement with the plurality of gears on the second primary shaft, and the first rigidly fixed gear is in driving engagement with the output shaft; and
a reverse countershaft having a plurality of odd and even gears selectively fixed thereto and a rigidly fixed gear attached thereto and drivingly engaged with the second rigidly fixed gear on the first countershaft,
wherein the odd gears on the reverse countershaft are selectively engaged with the plurality of gears mounted on the first primary shaft and the even gears on the reverse countershaft are selectively engaged with the plurality of gears mounted on the second primary shaft.

2. The dual clutch transmission of claim 1, wherein the first and second primary shafts are concentric.

3. The dual clutch transmission according to claim 1, wherein the first and second clutches are concentric clutches.

4. The dual clutch transmission according to claim 1, wherein the first and second clutches are parallel to each other.

5. The dual clutch transmission according to claim 1, wherein the second countershaft includes a second rigidly fixed gear, wherein the reverse countershaft includes a second rigidly fixed gear selectively drivingly engaged with the second rigidly fixed gear mounted on the second countershaft.

6. The dual clutch transmission according to claim 1, wherein the number of gears on the reverse countershaft is less than or equal to half the number of gears on the first and second countershafts.

7. The dual clutch transmission according to claim 1, wherein the first and second clutches are housed in a clutch housing drivingly connected to the input shaft.

8. The dual clutch transmission of claim 7, wherein the first clutch is a wet-plate style clutch including a first set of clutch plates directly connected to the clutch housing and a second set of clutch plates directly connected to the second primary shaft and wherein the second clutch is a wet-plate style clutch including a first set of clutch plates directly connected to the clutch housing and a second set of clutch plates directly connected to the first primary shaft.

9. The dual clutch transmission according to claim 1, further comprising a preselector system for selectively fixing the plurality of even and odd gears to the first countershaft, second countershaft and the reverse countershaft.

10. A dual clutch transmission, comprising:
an input shaft drivingly connected to an engine;
a primary shaft having a plurality of gears rotatably mounted thereto;
a first clutch drivingly engaged with the input shaft and a first countershaft;
a second clutch drivingly engaged with the input shaft and a second countershaft;
a first reverse countershaft;
a second reverse countershaft
wherein the first countershaft has a plurality of odd gears selectively fixed thereto and a rigidly fixed gear attached thereto, wherein the plurality of odd gears are selectively in driving engagement with the plurality of gears on the primary shaft and the rigidly fixed gear is in driving engagement with the first reverse countershaft,
wherein the second countershaft has a plurality of even gears selectively fixed thereto and a rigidly fixed gear attached thereto, wherein the plurality of even gears are in selective driving engagement with the plurality of gears on the primary shaft and the rigidly fixed gear is in driving engagement with the second reverse countershaft,
wherein the first reverse countershaft has a plurality of even gears selectively fixed thereto and in selective driving engagement with the plurality of gears on the primary shaft and a rigidly fixed gear attached thereto drivingly engaged with the rigidly fixed gear on the first countershaft,
wherein the second reverse countershaft has a plurality of odd gears selectively fixed thereto and in selective driving engagement with the plurality of gears on the primary shaft and a rigidly fixed gear attached thereto drivingly engaged with the rigidly fixed gear on the second countershaft.

11. The dual clutch transmission of claim 10, wherein the number of gears on the first and second reverse countershafts is less than or equal to the number of gears on the first and second countershafts.

12. The dual clutch transmission of claim 10, wherein the first and second clutches are parallel to each other.

13. The dual clutch transmission of claim 10, further comprising a first clutch housing and a second clutch housing, wherein the first and second clutch housings are drivingly connected to the input shaft.

14. The dual clutch transmission of claim 10, further comprising a preselector system for selectively fixing the plurality of even and odd gears to the first countershaft, second countershaft, the first reverse countershaft and the second reverse countershaft.

* * * * *